Feb. 13, 1951  R. F. PRESSWOOD  2,541,284
GRASS CUTTER MACHINE FOR TRIMMING GRASS EDGES
Filed May 16, 1947  4 Sheets-Sheet 1

INVENTOR
REGINALD F PRESSWOOD
BY
ATTORNEY

Feb. 13, 1951 R. F. PRESSWOOD 2,541,284
GRASS CUTTER MACHINE FOR TRIMMING GRASS EDGES
Filed May 16, 1947 4 Sheets-Sheet 2

INVENTOR
REGINALD F PRESSWOOD
BY
ATTORNEY

Feb. 13, 1951 R. F. PRESSWOOD 2,541,284
GRASS CUTTER MACHINE FOR TRIMMING GRASS EDGES
Filed May 16, 1947 4 Sheets-Sheet 3
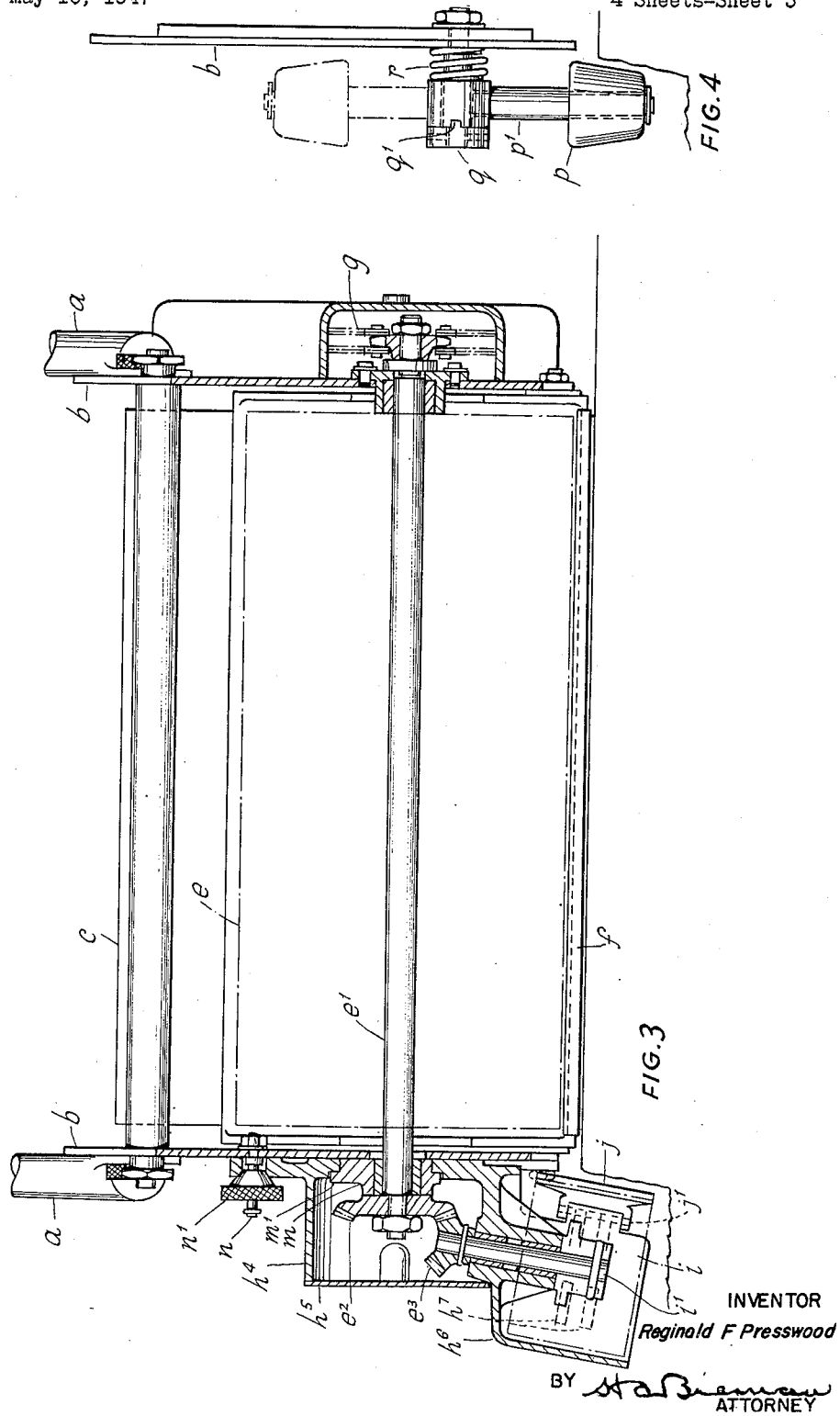
INVENTOR
Reginald F Presswood
BY H. A. Brennan
ATTORNEY

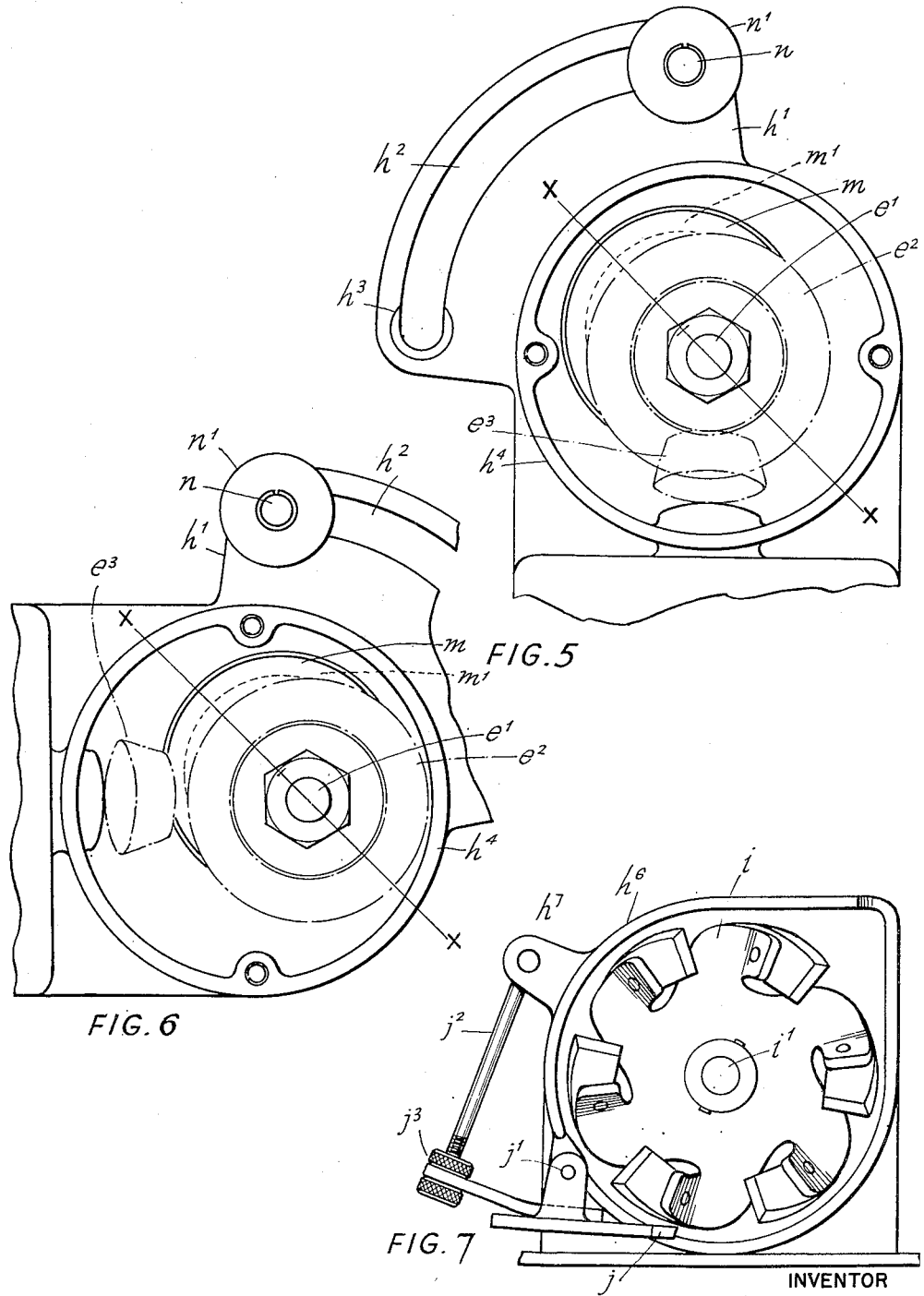

Patented Feb. 13, 1951

2,541,284

UNITED STATES PATENT OFFICE 2,541,284

GRASS CUTTER MACHINE FOR TRIMMING GRASS EDGES

Reginald Frederick Presswood, Bramcote, England

Application May 16, 1947, Serial No. 748,435
In Great Britain April 13, 1946

Section 1, Public Law 690, August 8, 1946
Patent expires April 13, 1966

9 Claims. (Cl. 56—251)

This invention relates to an improved grass cutter machine for trimming grass edges, such as for trimming the edges of lawns or grass verges to flower beds.

Such trimming operation takes a lot of time and is usually effected by means of long-handled shears although various alternative mechanical devices have been proposed for the purpose.

The object of the present invention is an improved grass cutter machine particularly suitable for use where there is a lot of such trimbing, as in parks.

According to the invention the improved grass cutter machine for trimming grass edges comprises a chassis having rollers or wheels for movement on the grass adjacent to the edge to be trimmed; guide means adapted to engage said edge for guiding the chassis relative thereto and a cutter cylinder and complementary blade, with means for driving the cutter cylinder, said cylinder and blade being arranged so as to cut the grass projecting beyond said edge in the same manner as a grass mower.

In the accompanying drawings:

Fig. 3 is a section on line 3—3 of Fig. 1.

Fig. 4 is a detail front view showing the guide roller.

Figs. 5 and 6 are diagrammatic views showing alternative positions for the edge cutter.

Fig. 7 is a view of the edge cutter unit taken in the direction of the arrow 7 on Fig. 3.

Figure 1:
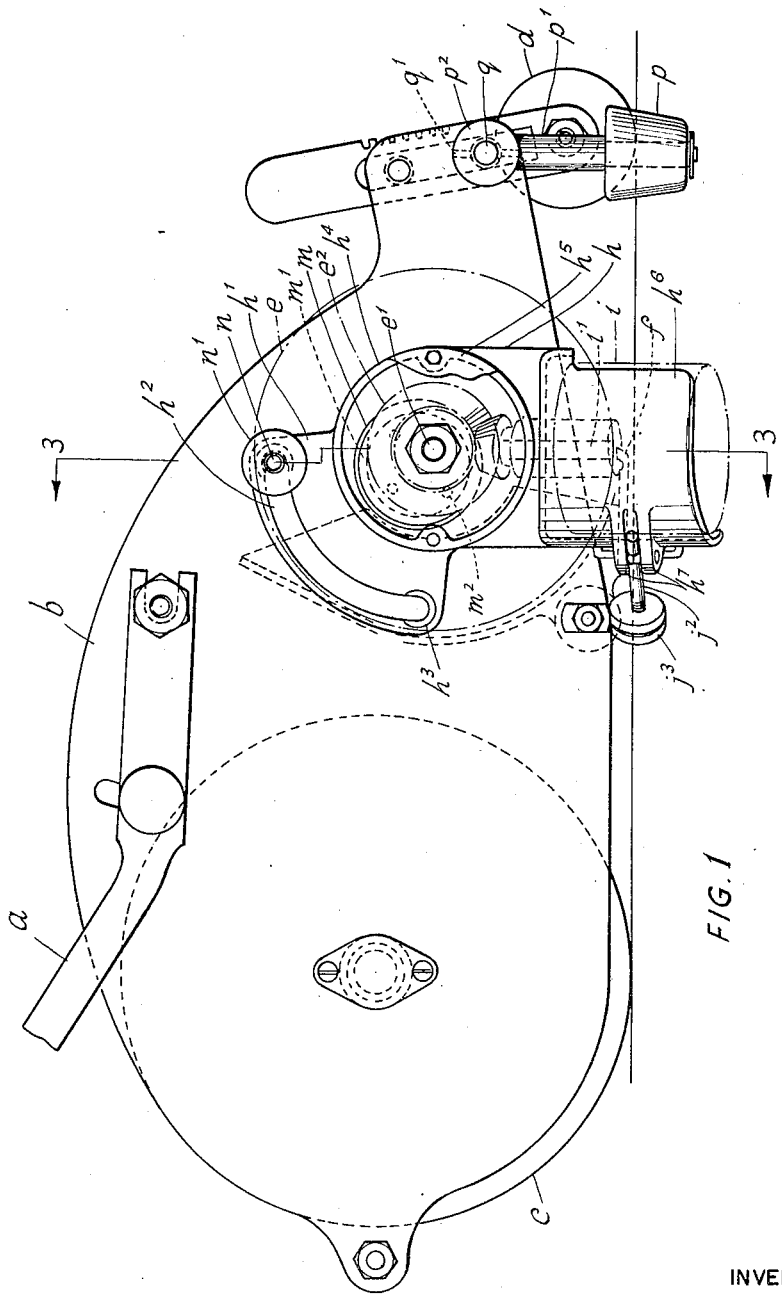
Fig. 1 is a side elevation of one example of grass cutter machine constructed in accordance with the invention.
Figure 2:
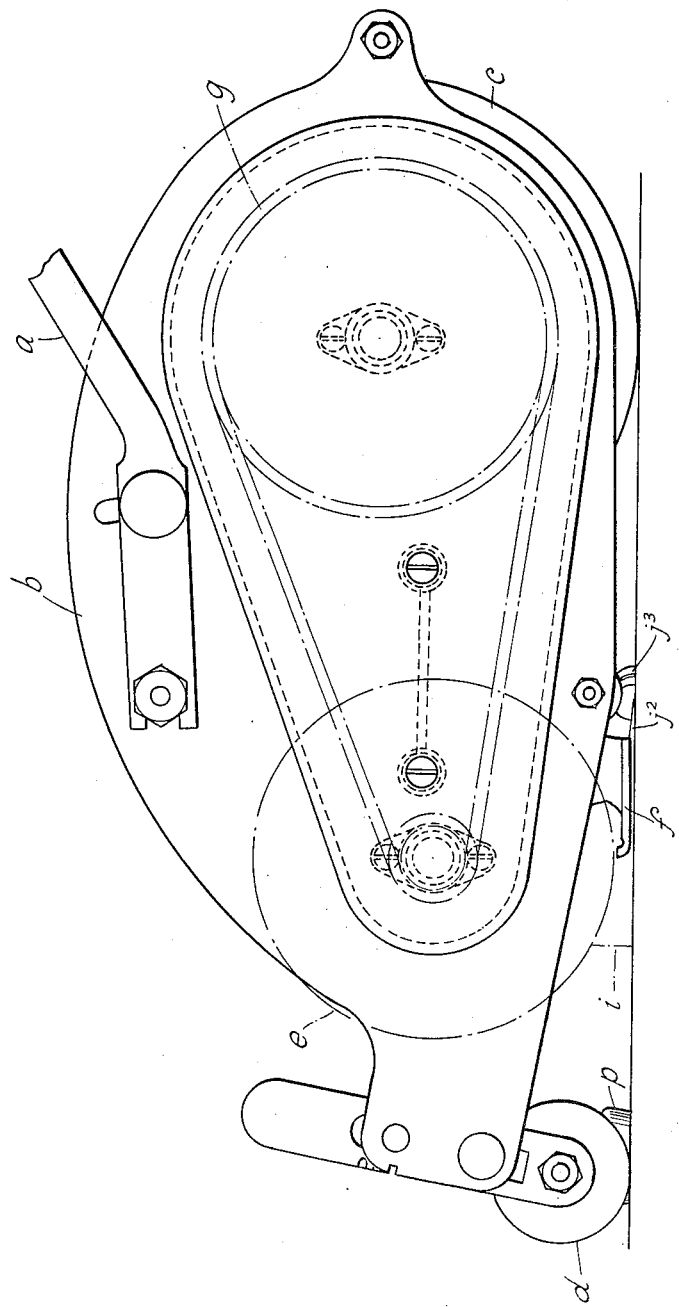
Fig. 2 is a view similar to Fig. 1 from the other side.

In the example of the invention shown in the drawings the improved machine embodies the essential elements of an ordinary small lawn mower for manual operation having a chassis fitted with handles $a$ said chassis comprising side frames $b$ between which are mounted a main driving roller $c$ and adjustable front roller $d$. The machine has the usual cutter cylinder $e$ and complementary bottom blade $f$ of an ordinary lawn mower the shaft $e'$ of the cutter cylinder being coupled at one end by sprockets and the usual driving chain $g$ for driving the cylinder from the driving roller $c$. The other end of the shaft $e'$ also projects beyond the side frame and mounted on such end of the shaft is a bevel pinion $e^2$. Supported in a bearing bracket $h$ secured to such side frame is a small edge-cutter cylinder $i$ mounted so that in side elevation of the machine its axle or shaft $i'$ appears vertical, see Fig. 1, but so that in front elevation of the machine (Fig. 3) its axle or shaft is inclined at about 15 degrees to the vertical. The bearing bracket $h$ also carries a cutter blade $j$ complementary to the edge-cutter cylinder $i$ and so positioned that it overhangs to lie close to the edge to be trimmed in the same manner as the cutter blade of a lawn mower moves over the lawn. The bearing bracket $h$ is adjustably mounted on an eccentric hub $m$ having a retaining flange $m'$ and secured to the side plate $b$ by means of screws $m^2$. The bracket has a quadrant $h'$ with arcuate slot $h^2$ complementary to a conical nut $n'$ on securing stud $n$ fixed in the side plate, the slot having conical end recesses $h^3$. As shown in Figs. 5 and 6 the centre of the hub $m$ is offset on the diameter X—X of the shaft $e'$ so that when the bracket is in the position shown in Fig. 5 the bevel gear $e^3$ on the edge cutter cylinder is in mesh with the bevel $e^2$ on the shaft $e'$, while, when the bracket is moved to the alternative position shown in Fig. 6 such bevel gears are disengaged. The bracket is formed with a housing $h^4$ and provided with a cover $h^5$ to enclose the bevel gearing. The cutter blade $j$ complementary to the edge-cutter cylinder is pivotally attached at $j'$ to a cover like extension $h^6$ of the bracket for the cylinder and is adjustable relative to the cylinder by means of a bolt $j^2$ and nut $j^3$, the bolt being pivotally mounted in lugs $h^7$ on the cover $h^6$.

The edge guiding means, shown particularly in Figs. 1 and 4 comprises a roller $p$ mounted on the end of an arm $p'$ having a hub $p^2$ pivotally mounted on a stud $q$ fixed in the side wall $b$ of the machine, such hub being urged outwardly by a spring $r$ so that the diametrical notch on the outer face of the hub may be engaged with a complementary diametrical projection $q'$ on the head of the stud to secure the arm in alternative upright positions as shown in full and dotted lines in Fig. 4.

Obviously, the invention is not limited to all the constructional details of the example above described, in so far as they may be modified without departing from the nature of the invention. For instance, the edge cutter axis could be vertical instead of tilted and could be power driven instead of from the driving roller. Also, the machine may be constructed solely as an edge cutter, that is to say, without the ordinary cutter cylinder and bottom knife, using a plain shaft in place of the cutter cylinder shaft. Obviously also spiral or other known and suitable alternative driving coupling may be used in place of bevel gearing to drive the edge cutter cylinder. Again the front horizontal roller could be as shown or otherwise adjustable as on a lawn mower to vary the depth of cut for different depth of edges, whilst the drive of the edge cutter cylinder could be by bevel gears direct from the main driving roller shaft.

What I claim is:

1. Lawn edge cutting elements for a lawn mower comprising a base plate, a fixed edge-cutter blade secured to the base plate, a complementary rotary edge-cutter cylinder on a spindle mounted in a bearing in the base plate, a driving gear wheel on the said spindle and means for mounting the base plate on the side of a lawn mower in co-operative relation to a complementary driving gear wheel on a driven shaft of the lawn mower so that the base plate may be moved to bring the edge cutter blade and cylinder into alternative operative or inoperative positions, said means including a mounting hub for the base plate adapted to be attached to the side of the mower eccentrically around the said driven shaft and on which hub the base plate is rotatably mounted, and means for securing the base plate in alternative positions about said hub, the eccentricity of the said hub relative to the driven shaft and the mower being such that when the base plate is turned so that the edge-cutter is in its edge-cutting position in the complementary driving gears are in mesh and so that when the base plate is turned to bring the edge cutter above ground level into its inoperative position, the complementary driving gears are disengaged.

2. Lawn edge cutting elements according to claim 1 characterised in that the securing means for the base plate includes an arcuate slot in the base plate in register with a screwed stud fixed on the side of the lawn mower, said slot having countersunk end portions, in combination with a securing nut located on the said stud and having a conical end adapted to engage to said countersunk end portions.

3. Lawn edge cutting elements according to claim 1 characterised in that the eccentric hub is formed with a retaining flange adapted to engage an outer face on the base plate so as to hold the latter against the side of the lawn mower while permitting rotational adjustment of the base plate.

4. Lawn edge cutting elements according to claim 1 characterised in that the edge-cutter cylinder and complementary cutting plate are inclined from the vertical for operating against an inclined or bevelled grass edge.

5. In a lawn mower having a frame, a horizontal shaft and a horizontal rotary cutter mounted thereon with means for actuating said shaft, a bearing bracket mounted on the side of said lawn mower and surrounding the end of said shaft, a housing for an edge-cutter mounted on said bracket for rotation thereon eccentrically with respect to said shaft, an edge-cutter in said housing depending below said rotary cutter when in operative position and mounted on an axle or shaft, gears on said shaft and axle or shaft adapted to mesh when in operative position, said housing being rotatable on said bracket to raise said edge-cutter into inoperative position and to disengage said gears, and means for locking said edge-cutter in said positions.

6. A lawn mower according to claim 5, in which said gears are bevel gears.

7. A lawn mower according to claim 5 in which said bracket carries a quadrant having a slot on an arc taken with said eccentric bracket as a center, a stud on said frame extending through said slot and securing means for said quadrant on said stud.

8. A lawn mower according to claim 5 in which the angle between said shaft and axis is slightly greater than 90°.

9. A lawn mower according to claim 5 in which an arm extends forwardly from and secured to said bracket, a horizontal stud on said arm, an edge guide rotatably mounted on said stud, and means for holding said guide in operative and inoperative positions.

REGINALD FREDERICK PRESSWOOD.

REFERENCES CITED

The following references are of record in the file of this patent:

UNITED STATES PATENTS

| Number | Name | Date |
|---|---|---|
| 1,054,320 | Slatter | Feb. 25, 1913 |
| 1,747,542 | Goldsmith | Feb. 18, 1930 |
| 1,844,190 | Stultz | Feb. 9, 1932 |
| 1,950,910 | Willrodt et al. | Mar. 13, 1934 |

FOREIGN PATENTS

| Number | Country | Date |
|---|---|---|
| 22,449 | Australia | May 1, 1935 |